United States Patent Office 3,347,662
Patented Oct. 17, 1967

---

3,347,662
PROCESS FOR EXTRACTION OF METALS
James M. Snyder, Memphis, Tenn., assignor to E. I. du Pont de Nemours and Company, Wilmington, Del., a corporation of Delaware
No Drawing. Filed Jan. 22, 1965, Ser. No. 427,463
6 Claims. (Cl. 75—106)

This invention relates to a process for separating copper minerals from their ores by leaching or extracting with cyanide solutions.

Most of the commercially important copper ores now remaining are of relatively low copper content, from one or two percent to less than one percent of copper. Because of high costs of transportation and of smelting such lean ores, it is necessary to concentrate the copper bearing minerals to obtain a fraction whose copper content will be at least 20% and preferably considerably higher. Flotation is a generally preferred method of concentrating lean copper ores; however, it is frequently not applicable to oxidized ores. Copper ores may be divided into two classes, (1) sulfide ores, whose principal copper bearing minerals are sulfides, e.g., bornite $$(FeS \cdot 2Cu_2S \cdot CuS)$$

chalcocite ($Cu_2S$), chalcopyrite ($CuFeS_2$), enargite ($3CuS \cdot As_2S_5$), or tetrahedrite ($4Cu_2S \cdot Sb_2S_3$), and (2) oxidized ores, whose principal copper bearing minerals are not sulfides, and may be such compounds as azurite  ($2CuCO_3 \cdot Cu(OH)_2$), cuprite ($Cu_2O$) malachite $$(CuCO_3 \cdot Cu(OH)_2)$$

chrysocolla ($CuSiO_3$), and other complex and less well defined silicates. The class of sulfide ores can generally be concentrated economically and effectively by flotation operations. It is frequently necessary to find other means of concentrating oxidized copper ores. Various leaching processes have been developed and applied commercially, and good descriptions of the principal operations is given in Allison Butts, "Copper," ACS Monograph Series, No. 122, Reinhold Publishing Corp., New York, 1954. A number of acid leaching processes are described in this publication. Such processes are economical and effective unless the ore body is an alkaline deposit. In some locations copper minerals are associated with appreciable proportions of calcium or magnesium carbonates. These alkaline constituents result in prohibitive consumption of acid, and extraction with acid is not an economical method of concentrating such ores. Extraction of copper ores with ammoniacal solutions is described in the just-mentioned publication, and such a process is compatible with alkaline ores. However, such a process has been rarely used. Concentration of copper from dilute ores by extraction with metal cyanides is another process that is compatible with alkaline ores. Since the metal cyanides are relatively expensive, their use in concentrating lean ores has not been commercially attractive.

It is, therefore, the principal object of this invention to provide an economical process for extracting copper from its ores. A more specific object of this invention is to provide a process for extracting copper from oxidized copper ores. Other objects will become apparent from the detailed description which follows.

The objects of this invention are accomplished by a process which comprises contacting mineral particles containing copper values with an aqueous leaching solution of hydrogen cyanide in the presence of a compound selected from the group consisting of (a) alkali metal and ammonium carbonates and bicarbonates, and (b) alkaline earth metal carbonates. The carbonates and bicarbonates may be either water soluble or water insoluble. The particles are maintained in contact with the leaching solution, preferably with agitation, for a period of time sufficient to cause a substantial portion of the copper to dissolve in the solution. The remaining undissolved solid particles are then separated from the solution by conventional physical means. The copper can be isolated from this solution by precipitation with a suitable acid as will be described later herein.

It is quite surprising that an aqueous solution of hydrogen cyanide can be used to extract copper from its ore. Prior to the present discovery, it was considered essential in cyanide leaching processes that the hydrogen cyanide be converted to a metal cyanide compound by neutralization with a strong alkali such as sodium or calcium hydroxide. The leaching solution prepared, therefore, contained a metal cyanide solid rather than free hydrogen cyanide. The use of metal cyanides were considered to be necessary in view of the fact that copper minerals which were soluble in the metal cyanide solutions were known to be essentially insoluble in aqueous hydrogen cyanide. According to the present invention, it has been found that the problem of insolubility in aqueous hydrogen cyanide solutions can be solved by introducing into the leaching solution a carbonate or bicarbonate as previously described. The hydrogen cyanide and bicarbonate or carbonate act synergistically to effect extraction of the copper. This is readily apparent since hydrogen cyanide is a much weaker acid than carbonic acid, and cyanide solutions cannot be prepared from the free hydrogen cyanide and carbonates or bicarbonates alone.

The process of this invention my be carried out using physical techniques and equipment commonly used in the ore extraction art. Since this invention is particularly useful for processing relatively lean copper ores, those containing on the order of 1% of copper or less, the bulk of the leaching solutions will ordinarily be comparable to the bulk of the material being extracted. Therefore, equipment should be designed to handle relatively dilute solutions. While it is possible to use a number of stages of countercurrent contacting and obtain a concentrated solution, the increased equipment costs, generally outweigh the advantages of lower solution volumes.

Concentrations of reagents used in this process are not generally critical. For best results the copper-bearing ore is treated with an aqueous solution containing at least 1, and preferably 2 to 10 or more parts by weight of hydrogen cyanide per part of cyanide-soluble copper. A weight ratio of about 1:1 is near the minimum that will retain the copper minerals in solution. Frequently, a 2:1 weight ratio will give maximum extraction of the copper. At least 1 equivalent of carbonate or bicarbonate per mol of cyanide-soluble copper must be present. This essential component may be introduced by adding the carbonate or bicarbonate directly to the aqueous hydrogen cyanide solution. Alternatively, part or all of the carbonate required to effect dissolution of the copper may be native to the ore.

In preparing the aqueous treating solution, a concentration of from about 0.01% to about 10% by weight of hydrogen cyanide may be used, with 0.1% to 4% being preferred. Lower concentrations of hydrogen cyanide result in unnecessarily dilute solutions so that large volumes must be handled. The dilute cuprocyanide solutions obtained with less than about 0.1% concentrations of hydrogen cyanide also tend to give colloidal suspensions of cuprous sulfide when hydrogen sulfide is used as the acid to effect precipitation of the copper. High concentrations of hydrogen cyanide increase the problem of handling this volatile and toxic reagent and also increase the rate of cyanide loss due to polymerization and hydrolysis.

As previously stated, the source of carbonate may be external or native to the ore. If the carbonate is native to the ore, it may be present in amounts in excess of that required for dissolution of the copper minerals. In either case, it is important that at least one equivalent per mole of cyanide-soluble copper be provided in order to complete solution of the copper. The upper limit is not critical and 20 equivalents or more of carbonate per mole of soluble copper may be used in the extraction step. However, such a large excess would be unnecessarily extravagant and would tend to promote loss of hydrogen cyanide by polymerization. A preferred range is 2 to 10 equivalents of the carbonate or bicarbonate per mole of cyanide-soluble copper when the carbonate or bicarbonate is added from an external source. In adding the carbonate, the external source may be a natural occurring carbonate, e.g. limestone obtained from a nearby deposit. Alternatively, two different sources of ore, one having a high carbonate content, may be blended to provide the requisite amount.

The particular bicarbonate or carbonate selected will depend to some extent on the method to be used for isolating the copper concentrate from the leaching solution. If isolation is effected by use of sulfuric acid in the presence of sulfide, cuprous sulfide will be obtained. In that case it will be desirable to use calcium carbonate in the extraction or leaching step in order that calcium sulfate will be precipitated with the cuprous sulfide. The residual liquor will be substantially free of dissolved sulfates and suitable for recycle to the extraction step. Cuprous sulfide may also be precipitated from the cuprocyanide-containing solution by treatment with carbon dioxide and sulfides or with hydrogen sulfide alone. If calcium carbonate is used in the extraction step and carbon dioxide is used as the source of acid in the precipitation step, calcium carbonate will be precipitated with the cuprous sulfide. In this case it may be desirable to use a second concentration step by subjecting the mixture of calcium carbonate and cuprous sulfide precipitates to a flotation treatment. The calcium carbonate underflow from the flotation treatment will be suitable source of carbonate for the leaching or extraction step. Alternatively, if a water-soluble carbonate or biacrbonate is used in the leaching step and cuprocyanide is precipitated by treatment with carbon dioxide, the supernatant liquor will contain dissolved bicarbonate or carbonate and may be recycled directly to the leaching step. In this case, only sufficient soluble carbonate or bicarbonate need be added to the leaching step to make up for the handling losses that occur in each cycle.

The temperature during the leaching step is ordinarily held at ambient, or slightly higher. The lower limit on temperature will be the freezing point of the extraction solution, which will be somewhat below 0° C., depending on the solution concentration. Higher temperatures will give somewhat higher rates of extraction. Temperatures above 50° C. may be used, but the rate of loss of hydrogen cyanide by hydrolysis and polymerization will be increased, and such temperatures will not ordinarily be economical. Higher temperatures also raise the vapor pressure of hydrogen cyanide and increase the difficulty of handling this volatile material. The preferred temperature range is 0° C. to 40° C.

The extraction will usually be carried out essentially at atmospheric pressure, but pressures both below and above atmospheric may be used. As the copper minerals go into solution, carbon dioxide is formed, as illustrated by the following equation:

$$Cu_2O + 2CaCO_3 + 6HCN \rightarrow 2CaCu(CN)_3 + 2CO_2 + 3H_2O$$

When the solubility of carbon dioxide in the extract solution is exceeded, as will frequently occur, gaseous carbon dioxide will be evolved. Since hydrogen cyanide is volatile, the evolved carbon dioxide will carry with it small amounts of hydrogen cyanide vapors, and the gases will be hazardous. If carbon dioxide is used to acidify the liquor to precipitate cuprous sulfide, carbon dioxide given off in the extraction step will have economic value, and it will be desirable to contain the evolved gases and conduct them to the precipitation apparatus. Even if it is not desired to conserve the evolved carbon dioxide, it will be necessary to contain it until it has been treated to remove hydrogen cyanide before it is discharged to the atmosphere. Removal of hydrogen cyanide from carbon dioxide may for instance be accomplished by scrubbing the gases with an adequate amount of water. In order to contain the gases, the extraction will be carried out in an enclosed vessel. A slight draft may be applied to this vessel to ensure that none of the gas mixture escapes if leaks develop in the apparatus. On the other hand the vessel may be operated under a slight positive pressure so that the gaseous mixture will flow naturally through conduits provided to conduct it away from the extraction equipment. Under some circumstances it may be preferable to avoid the problem of handling a gaseous mixture from the extraction step by operating at sufficient pressure that the carbon dioxide remains dissolved. The exact pressure required will depend on the relative volumes of ore and extract solution, on the concentration of copper, and on the temperature. When operating near 0° C. with dilute solutions, atmospheric pressure may be adequate to keep all of the carbon dioxide dissolved. It may occasionally be desirable to cool the extract solution, and perform the extraction at temperatures substantially below ambient to avoid gas evolution without the use of elevated pressure. When ores containing substantial amounts of copper sulfides are being worked, it will be desirable to remove the carbon dioxide in order to improve copper sulfide solubility, and sub-atmospheric pressures may be employed to facilitate escape of the carbon dioxide.

A theoretical lower limit on pressure is set by the pressure at which boiling of the extract solution occurs. For a 10% solution of hydrogen cyanide used at 50° C. this would be 14.5 pounds per square inch, absolute. For a dilute solution used at 0° C., this would be below one pound per square inch, absolute. However, no advantage is conceived in operating at such a low pressure. The preferred range of pressures is from one-half to five atmospheres, absolute.

The following examples in which parts and percentages are by weight unless otherwise indicated further illustrate the present invention.

*Example 1*

An ore sample obtained from an Arizona deposit was ground to pass through a 140-mesh sieve. The sample analyzed about 1.1% total copper of which 90% was non-sulfide copper. The non-sulfide copper was present primarily as the basic carbonate, malachite, with lesser proportions of the silicate, chrysocolla, and a cuprite, cuprous oxide. The sulfide copper was predominantly chalcopyrite with lesser amounts of chalococite and covellite. The calcium carbonate content of the ore was about 20.%

A 10-gram sample of the ore was placed in an Erlenmeyer flask together with 50 milliliters of water containing 4.1 grams of hydrogen cyanide. To the mixture was added 0.06 gram of calcium carbonate. The vessel was loosely covered and shakened for 16 hours. The temperature during this period was about 22° C. The slurry was filtered, and the filtrate was analyzed for copper. The analysis was carried out by adding nitric and sulfuric acids to the filtrate and evaporating the liquids on a hot plate until white fumes were evolved. The solution was then cooled and diluted with distilled water. A 33% solution of urea was added to the solution, and the mixture was boiled for a few minutes after which it was cooled and neutralized by addition of concentrated ammonium hydroxide. Glacial acetic acid was first added, and then a saturated solution of potassium iodide was added. The amount of iodine liberated was determined by titration with a standardized sodium thiosulfate solution. Total grams of copper in the original solution was computed using the relationship: (milliliters sodium thiosulfate solution) × (normality of sodium thiosulfate solution) × 0.06354. It was found that 0.06 gram of copper had dissolved.

*Example II*

In another experiment, 10 grams of the ore described in Example I was slurried with 50 milliliters of water containing 4.1 grams of hydrogen cyanide in a small Erlenmeyer flask. After shaking the vessel for 16 hours at about 22° C., the slurry was filtered and the filtrate analyzed for copper. It was found that 0.06 gram of copper had dissolved. It is shown by this experiment that the carbonate content required for dissolving the copper can be supplied from the ore itself.

*Example III*

The procedure described in Example I was repeated except that 25 milliliters of water and 1.0 gram of hydrogen cyanide was used. The filtrate obtained contained 0.079 gram of copper.

*Example IV*

Solubility of various copper compounds in aqueous solutions containing 4.3% hydrogen cyanide was measured by shaking a slight excess of the finely divided solid with the aqueous solution of hydrogen cyanide at room temperature, then filtering and analyzing the filtrate for copper. In all cases commercial reagents were used. Results are shown below in tabular form:

Copper compound: Copper concentration in filtrate, grams cu per 25 milliliters
 $Cu_2O$ _____ .007
 $CuCN$ _____ .009
 $Cu_2S$ _____ .003

*Example V*

This example shows that the same copper compounds tested in Example IV are readily dissolved by aqueous hydrogen cyanide in the presence of suitable carbonates or bicarbonates.

Solution of copper compounds in aqueous hydrogen cyanide solutions containing suspended or dissolved carbonates and bicarbonates was studied by shaking the finely divided solid copper compound with an aqueous mixture of hydrogen cyanide and carbonate or bicarbonate at room temperature, then filtering and analyzing the filtrate for copper. Commercial reagents were used in all cases. Results are shown below in tabular form:

| Copper Compound | Carbonate | Grams Carbonate Added | Grams HCN Added | Equivalent Grams Copper | | Copper Concentration in Filtrate Grams Cu per 25 mil. |
|---|---|---|---|---|---|---|
| | | | | Added | Dissolved | |
| $Cu_2O$ | $CaCO_3$ | 6 | 4.1 | 3.2 | 3.0 | 1.5 |
| $CuCN$ | $CaCO_3$ | 6 | 4.1 | 3.2 | 3.0 | 1.5 |
| $Cu_2S$ | $CaCO_3$ | .44 | .25 | .14 | .08 | .08 |
| $Cu_2S$ | $MgCO_3$ | .37 | .25 | .14 | .12 | .12 |
| $Cu_2S$ | $NaHCO_3$ | .74 | .25 | .14 | .11 | .11 |
| $Cu_2S$ | Ammonium [1] | .50 | .25 | .14 | .11 | .11 |

[1] Product of Fisher Scientific Co., U.S.A. stated composition $NH_4HCO_3 \cdot NH_4NH_2CO_2$.

*Example VI*

The following example shows that alkali metal or alkaline earth metal carbonates cannot be reacted with aqueous hydrogen cyanide to prepare the corresponding solutions of metal cyanide salts prior to contacting with a copper compound.

A suspension of calcium carbonate in aqueous hydrogen cyanide was prepared and observed at room temperature. The calcium carbonate remained undissolved. Finely divided cuprous cyanide was added to the suspension. The calcium carbonate dissolved and carbon dioxide was evolved.

Aqueous hydrogen cyanide was added to a solution of sodium carbonate in water. There was no gas evolution showing that hydrogen cyanide did not react. To the mixture solid cuprous oxide was added. The copper salt dissolved, and carbon dioxide was evolved.

In the preceding examples, calcium carbonate, magnesium carbonate, ammonium carbonate and sodium bicarbonate, are illustrated as effective in promoting solution of copper compounds in aqueous hydrogen cyanide. Any alkali metal carbonate or bicarbonate, e.g. those of sodium, potassium and lithium, any alkaline earth metal carbonate, e.g. those of barium, strontium, calcium and magnesium, ammonium carbonate and bicarbonate, and alkyl-substituted ammonium carbonates, such as the carbonate salt solutions of methyl and ethyl amine, dimethyl and diethyl amines, trimethyl and triethyl amines, piperidine, morpholine, and the quaternary ammonium carbonates and bicarbonates such as tetramethyl and tetraethyl ammonium carbonate are effective. Guanidine carbonate is also effective.

The process of the invention may be carried out in a large scale operation by percolation leaching, or by extraction with agitation. These two general processes for ore extraction are discussed at pages 311 and 312 of the Allison Butts Monograph mentioned previously herein. In percolation leaching the ore is broken down to a more or less uniform particle size of perhaps ¼-inch diameter and disposed in a vat in such a fashion that the ore can be contacted effectively with the leaching solution. If an insoluble carbonate is to be used in combination with the hydrogen cyanide, it is desirable that it be provided in a particle size comparable to that of the ore, and that it be distributed fairly uniformly throughout the ore in the percolation vat. Appropriate particle size will be automatically obtained if the carbonate is native to the ore; however, if the ore contains only a modest excess of alkaline carbonate, it may be necessary to blend different lots of ore before filling the percolation vat in order to assure a good distribution of the carbonate through the ore mass. When the carbonate is provided from an external source, it is desirable that the carbonate be blended with the ore prior to filling the vat or that care be taken while filling the vat to distribute the carbonate throughout the mass of ore. If soluble carbonates or bicarbonates are used, good distribution through the ore mass is automatically obtained by dissolving the alkali in the same water as the hydrogen cyanide. In extraction by agitation (agitation leaching), both the ore and the insoluble alkalizing agent are finely divided and are brought into contact with the extract solution by mechanical agitation.

With either type of leaching sufficient contact time between ore and extract solution must be provided to complete the solution of copper. This can be as little as a few hours with agitation leaching and may be several days with percolation leaching. The extract solution is removed from the spent ore, usually by gravity separation, and is taken to other equipment where copper is isolated as a solid concentrate, and hydrogen cyanide is regenerated and recycled to the extraction step. Such a procedure is described by Leaver and Woolf in "Copper and Zinc in Cyanidation, Sulphide-Acid Precipitation," U.S. Dept. of Commerce, Bureau of Mines Technical Paper 494, U.S. Govt. Printing Office, Washington (1931). The solution which adheres to the spent ore contains both cyanide and copper in amounts sufficient to warrant recovery. This will ordinarily be accomplished by a counter-current washing operation such as discussed in the Allison Butts Monograph.

Water supplies are often limited in areas where copper ores occur, and it is necessary to regenerate the leaching solutions after recovery of the dissolved copper so that the water can be recirculated to the extraction equipment. When soluble carbonates or bicarbonates are used, it is an economic necessity that these also be regenerated in usable form. Calcium cuprocyanide solutions may be acidified with sulfuric acid in the presence of a near stoichiometric quantity of hydrogen sulfide, as described by Leaver and Woolf, and after separation of precipitated cuprous sulfide and calcium sulfate, the resultant solution of hydrogen cyanide in water is suitable for recycle. Calcium cuprocyanide solutions may also be acidified by treatment with carbon dioxide at atmospheric pressure in the presence of a stoichiometric amount of sulfide. In one experiment about two-thirds of the dissolved copper was precipitated from a calcium cuprocyanide solution by such a treatment. After separation of the precipitated cuprous sulfide and calcium carbonate, the resultant liquor is suitable for recirculation to the extraction equipment. Recirculation of a small proportion of the calcium cuprocyanide should not be uneconomical since the overall effect is merely an increase in the concentration of dissolved copper in the extract. If a sulfide ore is being treated it will probably be desirable to strip out the residual sulfide as hydrogen sulfide by sparging the liquor with carbon dioxide before returning it to the extraction equipment. In another experiment complete precipitation of copper from a calcium cuprocyanide solution was obtained by blowing the solution with a mixture of carbon dioxide and hydrogen sulfide, thereby removing hydrogen cyanide from solution. If such a process were carried out, the filtrate, after separation of precipitated cuprous sulfide and calcium carbonate, can be used to scrub hydrogen cyanide out of the carbon dioxide-hydrogen sulfide mixture, to regenerate the extract solution. Approximately half of the dissolved copper was precipitated from a sodium cuprocyanide solution by treatment with twice the theoretical amount of sulfide in an atmosphere of carbon dioxide. The resultant precipitate was essentially pure cuprous sulfide, as contrasted to the diluted precipitate obtained when calcium carbonate or calcium sulfate is precipitated with the cuprous sulfide. More complete precipitation should be possible by contacting such a solution with hydrogen sulfide at atmospheric pressure. The resultant solution, after separation of precipitate, should be sparged with carbon dioxide to remove the excess hydrogen sulfide and regenerate the soluble bicarbonate before recycle to the extraction equipment. More complete precipitation should also be possible by operating at superatmospheric pressures, using high pressure hydrogen sulfide, or a lesser amount of sulfide, together with high pressure carbon dioxide. Calcium cuprocyanide solutions can also be treated with a large excess of hydrogen sulfide to precipitate much of the dissolved copper as the essentially pure cuprous sulfide, calcium carbonate being precipitated separately in a treatment with carbon dioxide subsequent to removal of the cuprous sulfide from the liquor. Any small additional precipitate of cuprous sulfide together with the precipitated calcium carbonate can be recycled to the extraction equipment without separation. Carbon dioxide under pressure, together with a stoichiometric amount of sulfide, will also increase the degree of precipitation of copper from a calcium cuprocyanide solution, as compared to use of carbon dioxide at atmospheric pressure with theoretical sulfide.

Elimination of the alkali required to absorb hydrogen cyanide in preparing a calcium cyanide extract solution by use of naturally occurring calcium or magnesium carbonate can result in an appreciable savings. Ordinarily at least three mols of cyanide are used per mol of copper extracted, so that three equivalents of alkali would be required. The equivalent weight of lime is 28 and the atomic weight of copper is 63.6. Therefore, 1.32 weights of lime would be required per weight of copper extracted. A current commodity price list indicates the bulk cost of lime to be about $14 per ton. Thus lime cost would be over $18 per ton of copper extracted. When the ore being treated contained an adequate amount of magnesium or calcium carbonates, this entire cost would be saved. With ores containing less alkalinity, savings would be reduced but could still be substantial if a convenient natural source of a suitable carbonate were available.

While the process of this invention was developed specifically to solve a problem in the processing of copper bearing ores, it is considered applicable generally to any problem of separation of copper compounds from mixtures, where extraction with cyanide solutions is advantageous, whether this be a naturally occurring mixture or not. Further, the process could be used for the extraction of an alkaline earth carbonate from a mixture, as for instance solution of strontium or barium carbonate by simultaneous treatment with a copper compound such as cuprous cyanide or sulfide, and aqueous hydrogen cyanide.

Since many different embodiments of the invention may be made without departing from the spirit and scope thereof, it is to be understood that the invention is not limited by the specific illustrations except to the extent defined in the following claims.

I claim:
1. A process for treating mineral particles containing copper values which comprises contacting said mineral particles with an aqueous leaching solution of hydrogen cyanide in the presence of a compound selected from the group consisting of (a) alkali metal and ammonium carbonates and bicarbonates and (b) alkaline earth metal carbonates for a sufficient period of time to cause a substantial portion of the copper to dissolve in the solution, and separating the undissolved solids from the solution.

2. The process of claim 1 wherein said leaching solution contains from about 2 to about 10 parts by weight of hydrogen cyanide per part of copper.

3. The process of claim 2 wherein 2 to 10 equivalents of said compound per mole of copper are present in said leaching solution.

4. The process of claim 3 wherein said compound is calcium carbonate.

5. A process for treating ore containing copper in oxidized form to recover copper values which comprises
   (1) contacting said ore in particulate form with an aqueous leaching solution containing from about 2 to about 10 parts by weight of hydrogen cyanide and from about 2 to 10 equivalents of a compound selected from the group consisting of (a) alkali metal and ammonium carbonates and bicarbonates and (b) alkaline earth metal carbonates, the amount of hydrogen cyanide and said compound being based on the amount of copper in said ore, (2) agitating the ore with the leaching solution for a sufficient period of time to cause a substantial portion of the copper to dissolve in the solution, (3) separating the undissolved solids from the solution, and (4) recovering the copper values from the solution.

6. The process of claim 5 wherein said compound is calcium carbonate.

References Cited

UNITED STATES PATENTS 805,017  11/1905  Joseph _____ 75—105

FOREIGN PATENTS 13,621  6/1911  Great Britain.

DAVID L. RECK, *Primary Examiner.*

N. F. MARKVA, *Assistant Examiner.*